United States Patent [19]

Funk

[11] 4,213,007
[45] Jul. 15, 1980

[54] METHOD AND APPARATUS FOR MONITORING A PULSE-CODE MODULATED DATA TRANSMISSION

[75] Inventor: Gerhard Funk, Ennetbaden, Switzerland

[73] Assignee: Patelhold Patentverwertungs- & Electro-Holding AG, Glarus, Switzerland

[21] Appl. No.: 940,568

[22] Filed: Sep. 8, 1978

[30] Foreign Application Priority Data

Sep. 13, 1977 [CH] Switzerland ............... 11146/77

[51] Int. Cl.² .............................................. H04B 3/36
[52] U.S. Cl. .................................. 375/10; 375/118; 371/22
[58] Field of Search ............ 178/69.1; 340/146.1 AB, 340/146.1 D, 146.1 E, 409, 214, 411; 325/41, 325, 31, 65, 42; 179/15 BS; 328/72, 74; 364/737

[56] References Cited

U.S. PATENT DOCUMENTS

| | | |
|---|---|---|
| 3,546,588 | 12/1970 | Campbell, Jr. .................... 325/42 |
| 3,562,710 | 2/1971 | Halleck .............................. 178/69.1 |
| 3,771,059 | 11/1973 | Butler et al. ........................ 325/31 |
| 3,851,101 | 11/1974 | Enetzl ................................ 178/69.1 |

*Primary Examiner*—Benedict V. Safourek
*Attorney, Agent, or Firm*—Orville N. Greene; Frank L. Durr

[57] ABSTRACT

An apparatus and method for monitoring the received pulses of a transmitted pulse code modulation signal to determine if the received pulses lie within a predetermined pulse distortion tolerance zone is disclosed. The received pulses are monitored to determine the number of received pulse edges which are received during first and second consecutive predetermined time zones, the total period of the time zones being equal to the period of the pulse pattern of the received message which would occur in the case of distortionless transmission. The first time zone extends around the position where the pulse edge of the received pulses would be in the case of distortionless transmission. An error recognition signal is generated when either more than one of the received pulse edges arrives during the first time zone or only one of the received pulse edges arrives during the second time zone.

6 Claims, 2 Drawing Figures

METHOD AND APPARATUS FOR MONITORING A PULSE-CODE MODULATED DATA TRANSMISSION

BACKGROUND OF THE INVENTION

The present invention is directed towards a method for monitoring the received pulses of a pulse-code modulated data transmission, within a predeterminable pulse distortion tolerance zone.

Methods are known which solve this problem by repeated sampling of the received pulses, followed by a majority decision in favor of one of the possible states "0", "1", as well as a decision zone for "suppressed pulse" error recognition. Other methods are known which utilize time integrated pulse evaluation, followed by a majority decision concerning the state of the pulse.

Both of these known methods involve increased technical demands and suffer from the disadvantage that pulse level changes with intervals which are short by comparison with the theoretical pulse length cannot be utilized for monitoring the signal quality. These disadvantages exist especially in those transmission systems which are meant to ensure a very small read-out error probability even when the transmission path suffers from heavy interference.

As is well known, the efficiency of any protection against non-recognizably wrong message evaluation depends to a high degree on the properties of the signal quality control.

The primary object of the present invention is to avoid the disadvantages of known methods. To this end, the distortion zone of the received pulses of the pulse-code modulated message is subdivided into two consecutive time zones. During the first of these zones (which extends around the theoretical instant of the expected pulse edge of the received message), a check is made to determine whether no more than one pulse edge has arrived during the first zone. If more than one edge arrives during this time zone, an error-recognition mark is set. An error-recognition mark is also set if during the supplementary second time zone only one pulse edge has arrived.

The relative percentages of the two time zones, whose sum equals the desired pulse length of the transmitted signal, are selectable in steps and adaptable to requirements as regards transmission reliability efficiency and quality of the transmission path.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE DRAWINGS

The invention will now be described, by way of example, with reference to FIGS. 1 and 2. The pulse code modulated message T (FIG. 1(c)), which arrives distorted due to interference, is compared with the undistorted time zones S (FIG. 1(a)), derived at the receiver 10. The phases of the edges of the pulse code modulated message T (FIG. 1(c)), which arrive distorted due to interference, are compared with the phases of the edges of the undistorted message S (FIG. 1(a)) derived at the receiver 10. The phases of the edges of the undistorted message S are synthesized at the receiver 10 from the incoming message by means of a known synchronizing circuit SYNC (FIG. 2), e.g. by flywheel synchronization with phase correction for the locally produced clock C.

The synchronizing circuit SYNC, which subdivides the locally generated fast clock signal C while taking into consideration the phases of the incoming pulse edges of message T, generates a plurality of sampling pulses U (FIG. 1(b)) which control the transfer of the received message T into the series/parallel register SPR. Each sampling pulse U is preferably, but not necessarily, generated in the middle of each pulse of the desired pulse path S and is applied to register SPR to clock the incoming pulses T into register SPR.

The synchronizing circuit SYNC has several terminals by means of which a time zone A around the theoretical pulse edge instants is selected via the distortion zone selectors VBS. Both the beginning and the end of the selected time zone A is determined by the signals $a_1$ and $a_2$, respectively, which signals control the flip-flop FF1. The time zone A preferably, but not necessarily, extends symmetrically around the theoretical edge instants. The distortion tolerance zones A and $\bar{A}$ are shown in FIG. 1(d). These zones define the preselected distortion tolerance limits.

Figure 1:
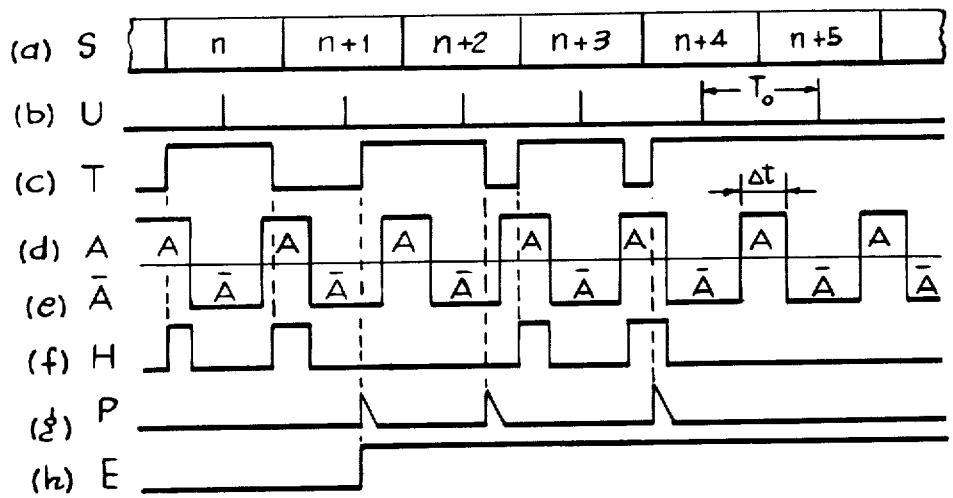
FIG. 1(a) illustrates the undistorted time zones of the transmitted signals.
FIGS. 1(b)–(g) illustrate several wave forms appearing at various points in the block diagram of FIG. 2.
Figure 2:
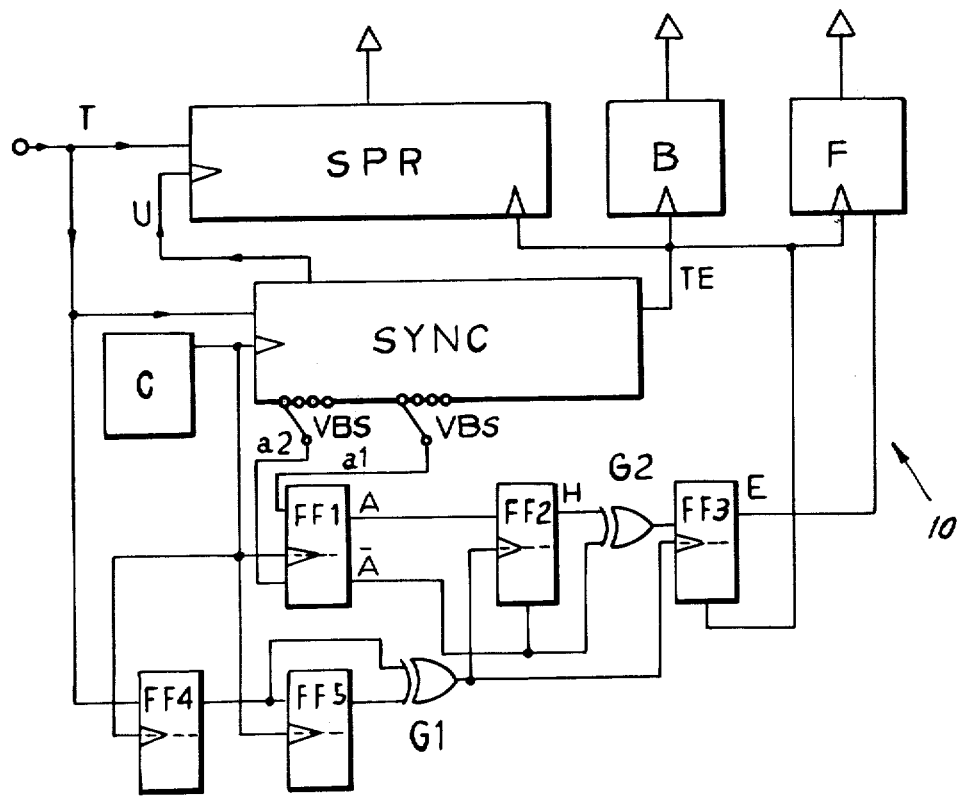
FIG. 2 is a block diagram of the preferred embodiment of the present invention.

If, during the time zone determined by the state $\bar{A}$ of flip-flop FF1, at least one of the pulse edges derived from the edge detector circuit comprising flip-flops FF4, FF5 and EXCLUSIVE OR gate G1 arrives, as has been assumed in FIG. 1 during the time zones n+1 and n+2, then flip-flop FF3 is set thereby generating the error recognition signal "E" (FIG. 1(g)).

If at least one edge arrives during the time zone A, first the flip-flop FF2 is set to state H (FIG. 1(e)). If, during the same time zone, at least a second edge arrives (as has been assumed in pulse n+4 of FIG. 1), OR gate G2 sets flip-flop FF3 thereby generating an error recognition signal E, flip-flop FF2 is reset during the time interval $\bar{A}$.

The telegram end signal "TE", derived from the synchronizing circuit "SYNC", sets stage B—"parallel message read-out ready"—and, if an error has been recognized during serial reception (i.e., if signal "E" had been generated), the signal TE also sets the error signal generator F and resets flip-flop FF3. The error set pulse P is illustrated in FIG. 1(f).

In a practical circuit embodiment, the time zone A can be set by means of the selectors VBS to the values $\Delta t/T_o = \pm 10\%$, $\pm 20\%$ and $\pm 40\%$, $\Delta t = A$ being the distortion tolerance zone and $T_o$ the duration of undistorted code elements.

The present invention may be embodied in other specific forms without departing from the spirit or essential attributes thereof and, accordingly, reference should be made to the appended claims, rather than to the foregoing specification as indicating the scope of the invention.

What is claimed is:

1. A method for monitoring the received pulses of a transmitted pulse code modulation signal to determine if said received pulses lie within a predetermined pulse distortion tolerance zone, said method comprising the steps of:

monitoring the arrival of edges of said received pulses to determine the number of edges of said received pulses which arrive during first and second consecutive predetermined time zones, the total period of said first and second time zones being equal to the period of the pulse pattern of said received message which would occur in the case of distortionless transmission, said first time zone extending around the position where the pulse edge of said received pulses would be in the case of distortionless transmission; and generating an error recognition signal when either more than one of said received pulse edges arrives during said first time zone or only one of said received pulse edges arrives during said second time zone.

2. The method of claim 1 wherein said first time zone extends symmetrically about the position where the pulse edge of said received pulses would be in the case of distortionless transmission.

3. An apparatus for monitoring the received pulses of a transmitted pulse code modulation signal to determine if said received pulse edges lie within a predetermined pulse distortion tolerance zone, an apparatus comprising:

synchronizing circuit means for subdividing a predetermined pulse distortion zone, whose period is equal to the desired period of said transmitted signal, into consecutive first and second time zones, said first time zone extending around the instant at which the pulse edge of said received pulses would occur in the case of distortionless transmission;

edge detector circuit means for generating an output signal indicative of the position of an edge of said received pulses; and logic circuit means for generating an error recognition signal whenever either more than one of said received pulse edges arrives during said first time zone or only one of said received pulse edge arrives during said second time zone.

4. The apparatus of claim 3, wherein said synchronizing circuit means generates first and second output signals which define the beginning and end of said first and second time zones and wherein said logic circuit comprises:

a first flip-flop whose inputs receive said first and second output signals generated by said synchronizing circuit means, said first flip-flop having a first output (A) corresponding to said first time zone and a second output ($\bar{A}$) corresponding to said second time zone;

a second flip-flop receiving said first output of said first flip-flop and the output of said edge detector means for generating an output signal whenever at least one pulse edge is detected during said first time period;

an OR gate having first and second inputs, one of said inputs receiving the output of said second flip-flop, the remaining of said inputs receiving said second output of said first flip-flop, said second flip-flop being reset during said second time zone by said second output of said first flip-flop; and a third flip-flop whose outputs receive both the output of said edge detector circuit means and said OR gate, said third flip-flop generating said error recognition signal when either more than one of said received pulse edges occur during said first time zone or when only one of said received pulse edges occurs during said second time zone.

5. The device of claim 3, wherein said edge detector circuit comprises a fourth flip-flop, a fifth flip-flop and an EXCLUSIVE OR gate, said fourth flip-flop receiving at a static input said received pulses and also receiving at a dynamic input, locally generated clock pulses, a static input of said fifth flip-flop being connected to an output of said fourth flip-flop, a dynamic input of said fifth flip-flop receiving said locally generated clock signal, the outputs of said fourth and fifth flip-flops being coupled to first and second inputs, respectively, of an OR gate, the output of said OR gate representing the output of said edge detector circuit means.

6. The device of claims 4 or 5 wherein said synchronizing circuit means includes means for adjusting the location of said first and second time zones.

* * * * *